United States Patent
Pistilli

(10) Patent No.: US 6,563,926 B1
(45) Date of Patent: May 13, 2003

(54) RESETTING SURGE PROTECTION IN TELEPHONE LINE INTERFACE CIRCUITS

(75) Inventor: Anthony A. Pistilli, Duluth, GA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/361,854

(22) Filed: Jul. 27, 1999

(51) Int. Cl.$^7$ ................................................ H04M 1/00
(52) U.S. Cl. ........................ 379/412; 379/399; 379/405; 379/413; 379/27.05; 379/93.05; 379/351; 361/111; 361/118
(58) Field of Search ............................ 379/399.01, 412, 379/377–379, 385, 27.05; 361/111, 118

(56) References Cited

U.S. PATENT DOCUMENTS

| | | | |
|---|---|---|---|
| 3,544,720 A | * 12/1970 | Corderman | |
| 3,860,767 A | * 1/1975 | Boucher et al. | 340/425.1 |
| 4,500,973 A | * 2/1985 | Ley | 708/7 |
| 4,709,296 A | 11/1987 | Hung et al. | |
| 4,947,427 A | 8/1990 | Rosch et al. | |
| 5,146,384 A | * 9/1992 | Markovic et al. | 361/55 |
| 5,163,090 A | 11/1992 | Pawlowski et al. | |
| 5,333,196 A | 7/1994 | Jakab | |
| 5,388,022 A | * 2/1995 | Ahuja | |
| 5,390,231 A | 2/1995 | Hung et al. | |
| 5,440,441 A | * 8/1995 | Ahuja | |
| 5,490,215 A | 2/1996 | Pelegris | |
| 5,534,768 A | * 7/1996 | Chavannes et al. | 363/267 |
| 5,539,820 A | 7/1996 | Pistilli | |
| 5,905,282 A | * 5/1999 | Sato et al. | 257/328 |
| 5,973,902 A | * 10/1999 | King | |
| 6,061,445 A | * 5/2000 | Rahamim et al. | |
| 6,157,529 A | * 12/2000 | Ahuja | |
| 6,288,883 B1 | 9/2001 | Chen | |

FOREIGN PATENT DOCUMENTS

| | | |
|---|---|---|
| DE | 43 26 596 A1 | 2/1995 |
| DE | 195 08 226 C1 | 8/1996 |
| EP | 0 185 213 A2 | 6/1986 |
| EP | 0 209 973 A1 | 1/1987 |
| EP | 0 291 169 A1 | 4/1988 |
| EP | 0 295 683 A2 | 12/1988 |

OTHER PUBLICATIONS

Atkinson, P.; Thyristors and their Applications;1972; Pub. Mills and Boon Limited; pp. 103–106.*
SGS–Thomson Microelectronics Application Note, 1998, Title: TRISIL™ Crowbar Type Protection Diode, pp. 1–7.
SGS–Thomson Microelectronics Application Note, 1998, Title: TRANSIL™/TRISIL™ Comparision, pp. 1–4.
Nu Horizons Electronics Corp., Title: SGS–Thomson–Gold Standards ASD™ and Discretes, pp. 1–2.
Copy of PCT publication and international search report for the corresponding PCT patent application.

* cited by examiner

Primary Examiner—Forester W. Isen
Assistant Examiner—Ramnandan Singh
(74) Attorney, Agent, or Firm—John C. Gorecki

(57) ABSTRACT

A surge reset circuit used to automatically reset a surge protection circuit within a telephone line interface circuit. A sensor (e.g., a zenering device) advantageously generates a voltage level representing current draining out of the transient voltage suppression portion of the surge protection circuit after a transient energy surge. If the current is draining, which may indicate a potential lockup situation, feedback circuitry generates a reset feedback signal that is provided to a cutoff device. The cutoff device, in response to receiving the feedback signal, disables a current limiter portion of the surge protection circuit to reduce the current draining from the transient voltage suppression portion. As the current level is reduced, the transient voltage suppression portion will reset when the current drops below a threshold value or is substantially eliminated. As a result, the feedback circuitry removes the reset feedback signal from the cutoff device to re-enable the current limiter.

26 Claims, 4 Drawing Sheets

RESETTING SURGE PROTECTION IN TELEPHONE LINE INTERFACE CIRCUITS

TECHNICAL FIELD

The present invention relates generally to automatically resetting a surge protection circuit, and specifically to systems and methods for automatically resetting a surge protection circuit within a telephone line interface circuit after receiving a transient energy surge, such as lightning or an AC voltage spike, by disabling and then re-enabling the surge protection circuit based on discharge current.

BACKGROUND OF THE INVENTION

Telephone line interface circuits are electronic circuits that service the conventional two-wire (the tip and ring wires) telephone subscriber lines. Active telephone line interface circuits, in which the tip and ring wires of a telephone subscriber are driven via active line circuits, are well known in the art. Exemplary active telephone line interface circuits are described in U.S. Pat. No. 5,274,702 issued to Rosch et al. on Dec. 28, 1993 entitled "Wideband Telephone Line Interface Circuit" and in U.S. Pat. No. 5,323,461 issued to Rosenbaum et al. on Jun. 21, 1994 entitled "Telephone Line Interface Circuit With Voltage Switching."

As described in the above-referenced patents, a line drive circuit in a telephone subscriber line interface circuit typically includes two unity-gain DC amplifiers whose outputs are coupled to the tip and ring wires, respectively, of the telephone subscriber line via a switching circuit and a sensing circuit. The telephone line interface circuit also includes a controlled voltage generator (more generally referred to as a power source) and a control circuit. The sensing circuit serves to monitor AC and DC conditions on the line and includes a sensing transformer and series resistors, which are generally referred to as feed resistors. The switching circuit serves, in association with software control via the control circuit, to interconnect the line, the line drive circuit, the controlled voltage generator, and a battery in various configurations to provide for different operating states of the line interface circuit. These states include configurations in which relay contacts connect the outputs of the line drive circuit or the output of the controlled voltage generator selectively to the tip and ring wires of the line, and in which relay contacts and an electronic switch selectively connect the output of the controller voltage generator or the battery as a supply voltage for the line drive circuit.

It is also well known to protect the line drive circuit in an active telephone line interface circuit from high transient voltages and currents (more generally referred to as transient energy surges) due to lightning, AC surges, and inductive coupling. To this end, it is known to couple a front-end protection circuit, such as a diode bridge, to points between the outputs of the line drive circuit and the feed resistors. As a front-end protection circuit, the diode bride clamps positive transient voltages to ground and clamps negative transient voltages to a breakdown voltage of a transient voltage suppressor (such as a thyristor), which is connected between a negative supply voltage and ground. In order to provide sufficient power dissipation for negative transient voltages or currents, a common solution uses several transient voltage suppression diodes (frequently referred to by the trade name TRANZOR™ or TRANSIL™ from SGS-Thomson Microelectronics) in combination. However, such a solution has the disadvantages of incurring a relatively high and undesirable cost. Additionally, such a solution requires a relatively large amount of physical space.

It would be desirable to be able to replace the transient voltage suppression diodes by a single crow-bar type protection device, frequently referred to by the trade name TRISIL™ or SIDAC™. However, such a device has the disadvantage that, if used in an active telephone line interface circuit, the current supplied by the line drive circuit can be sufficient to maintain or hold the protection device operative at and after the end of a negative transient voltage or surge. This commonly results in a locked up state of the telephone line interface card. In other words, the surge protection circuit within the telephone line interface circuit protects the card from damage in an inexpensive and space saving manner, but may possibly leave the card in an inoperable or locked up state.

The applicant discovered and patented an improved telephone line interface circuit aimed at avoiding these disadvantages. In particularly, U.S. Pat. No. 5,539,820 (hereinafter the 820 patent) issued on Jul. 23, 1996 to the applicant and is entitled "Protection of Active Telephone Line Interface Circuits" describes surge protection circuitry used for protecting the telephone line interface circuit from transient energy surges and is hereby incorporated by reference. As can be seen in the 820 patent, the surge protection circuitry uses a current limiter portion to protect a power supply in the interface and a front-end protection portion to protect against positive and negative transient voltages and currents.

In more detail, the front-end protection portion is described as a clamping diode, which is connected to a return on the telephone line interface circuit's power source. In this configuration, the clamping diode channels positive surge currents to the return when the potential rises to a diode drop above the return. The transient voltage suppression portion of the front-end protection circuitry is described as one or more specially designed diodes, such as a series combination of a thyristor and a clamping zener device. These diodes are designed to clamp excess voltages and to dissipate high transient power. When a negative voltage caused by a surge exceeds a predetermined threshold, the thyristor will breakover and create a path to the return for the negative surge current through the zenering device. In both instances (positive and negative surges), the surge current is diverted via the surge protection circuit to the return instead of to the power source where damage may occur.

Unfortunately, the applicant has found that in some situations, it is possible that the surge protection circuitry may become latched in an intermediate state. In particular, the applicant has found that the current supplied by the line drive circuit in intermittent situations may still be sufficient to maintain the operation of the surge protection circuit after the end of a negative transient voltage or surge without resetting back to a nominal state. In those rare but frustrating situations, continued use of the line interface circuit is not possible. While the surge protection circuit successfully protects the telephone line interface circuit, the protection circuit remains operative and undesirably blocks normal operation of the telephone line interface circuit.

In light of the foregoing, a need exists for an improved technique and system that prevents lockup of the surge protection circuit within the telephone line interface circuit. A need also exists for an improved technique and system to quickly and automatically reset the surge protection circuit within the telephone line interface circuit.

SUMMARY OF THE INVENTION

Accordingly, the present invention is directed to a method and apparatus for resetting a surge protection circuit within a telephone line interface that substantially obviates one or more of the limitations and disadvantages of the described prior arrangements.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve these and other objects and advantages, and in accordance with the purpose of the invention as embodied and broadly described herein, a telephone line interface's surge reset circuit consistent with the present invention includes a sensor and a feedback circuit. The sensor is connected to a discharge terminal of a surge protection circuit in the telephone line interface. The surge protection circuit usually includes a current limiter for protecting a power source in the telephone line interface and a transient voltage suppression circuit having the discharge terminal and being operatively connected to the current limiter. The sensor is typically a zener device that senses a discharge current that flows within the surge protection circuit through the discharge terminal. The feedback circuit is connected to the sensor and is capable of providing a reset feedback signal to the surge protection circuit. The reset feedback signal is provided in response to a voltage level detected across the sensor. More particularly stated, the voltage level detected is a voltage level across the zener device as the discharge current flows through the zener device. In this manner, the reset feedback signal resets the surge protection circuit.

Additionally, the feedback circuit may include a feedback transistor having a base electrically connected to the sensor. The feedback transistor may turn on and provide the reset feedback signal to the surge protection circuit when the sensor detects the discharge current.

The surge protection circuit may also include a current limiter and at least one thyristor connected to the current limiter for protecting a power source in the telephone line interface from a negative surge. In such a situation, the feedback transistor may disable the current limiter within the surge protection circuit when the sensor detects the discharge current in order to reset the thyristor.

Furthermore, the surge reset circuit may also include a cutoff device capable of disabling the current limiter when receiving the reset feedback signal from the feedback transistor. The cutoff device may also enable the current limiter within the surge protection circuit when the discharge current is below a threshold value and the reset signal is removed.

In another aspect, a surge reset circuit for use with a surge protection circuit in a telephone line interface and consistent with the present invention has a sensor connected to a discharge terminal of a first portion of the surge protection circuit. The sensor may be a nonlinear device (such as a zener device) that limits the voltage level across the nonlinear device when the nonlinear device is biased with current flowing through the current discharge terminal. The zener device typically has a characteristic limiting voltage value representing a maximum voltage drop across the zener device.

A feedback circuit is connected to the sensor and is capable of providing a reset feedback signal to a second portion of the surge protection circuit in response to a voltage level generated by the sensor representing a discharge current flowing through the discharge terminal. The feedback circuit usually includes a feedback transistor having a base connected to the sensor and controlled by the detected voltage level across the sensor. The feedback transistor may turn on and provide the reset feedback signal to the cutoff device when the sensor detects the discharge current and generates the voltage level.

Finally, the surge reset circuit includes a cutoff device connected between the feedback circuit and the second portion of the surge protection circuit. The cutoff device is capable of resetting the surge protection circuit by disabling the second portion of the surge protection circuit (such as a current limiter) in response to the reset feedback signal. The cutoff device is typically capable of resetting the front-end protection circuit by reducing the discharge current through the discharge terminal while the sensor detects the discharge current. Additionally, the cutoff device is typically further capable of enabling the diode current limiter when the discharge current is substantially eliminated. The cutoff device is normally implemented as a power MOSFET device itself or the power MOSFET device and its associated controlling circuit.

In yet another aspect, a method consistent with the present invention is shown, for resetting a surge protection circuit within a telephone line interface. The method comprises the steps of receiving a transient energy surge within the telephone line interface, protecting a power source within the telephone line interface during the transient energy surge using the surge protection circuit, sensing an amount of current draining from the surge protection circuit, and automatically resetting the surge protection circuit for a next surge based upon the current draining from the surge protection circuit. Automatically resetting the surge protection circuit is typically done by disabling a current limiter portion of the surge protection circuit, reducing current flowing through a negative surge protection portion of the surge protection circuit, and enabling the current limiter portion of the surge protection circuit.

In more detail, disabling the current limiter portion is usually accomplished by generating a voltage level by a sensor (such as a zener device) that is configured between a return of the power source in the telephone line interface and a current discharge terminal of the negative surge protection portion of the surge protection circuit. A feedback circuit may then be activated to generate a reset feedback signal if the current is sensed to be draining. This is typically accomplished by turning on a feedback transistor within the feedback device in response to the generated voltage level across the zener device and then drawing a feedback current through the feedback transistor to generate the reset feedback signal. Once the feedback circuit is activated, the reset feedback signal may be provided to a cutoff device, which disables the current limiter portion.

Additionally, the draining step usually involves reducing the amount of current from the negative surge protection portion to reset the negative surge protection portion. In other words, the current flowing through the negative surge protection portion is reduced to reset the negative surge protection portion of the surge protection circuit. In this manner, the current limiter portion of the surge protection circuit may be enabled (typically by removing the reset feedback signal from a cutoff device) after the negative surge protection portion is reset.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with an embodiment of the present invention, a surge reset circuit is used to automatically reset a surge protection circuit within a telephone line interface circuit. Typically, the surge protection circuit includes a current limiter portion and a transient voltage suppression portion. After the surge protection circuit has been engaged to protect the telephone line interface circuit, a holding current for the transient voltage suppression portion may be supplied from loop drivers powered by the interface's power source through the current limiter portion of the protection circuitry. This holding current may lock up the surge protection circuitry and prevent normal operation of the telephone line interface circuit. To address this problem, a sensor (e.g., a zenering device) advantageously detects the presence of holding current (also known as discharge current) flowing through the transient voltage suppression portion after a transient energy surge. If there is holding current detected (indicating a potential lockup situation), additional circuitry disables the current limiter to reduce or substantially eliminate the current flowing through the transient voltage suppression portion. As the discharge current is reduced, the transient voltage suppression portion will reset. As a result, the additional circuitry re-enables the current limiter and the telephone line interface circuit is back to an operational state with its surge protection circuit ensured to be in its nominal state ready for the next transient energy surge.

Figure 1:
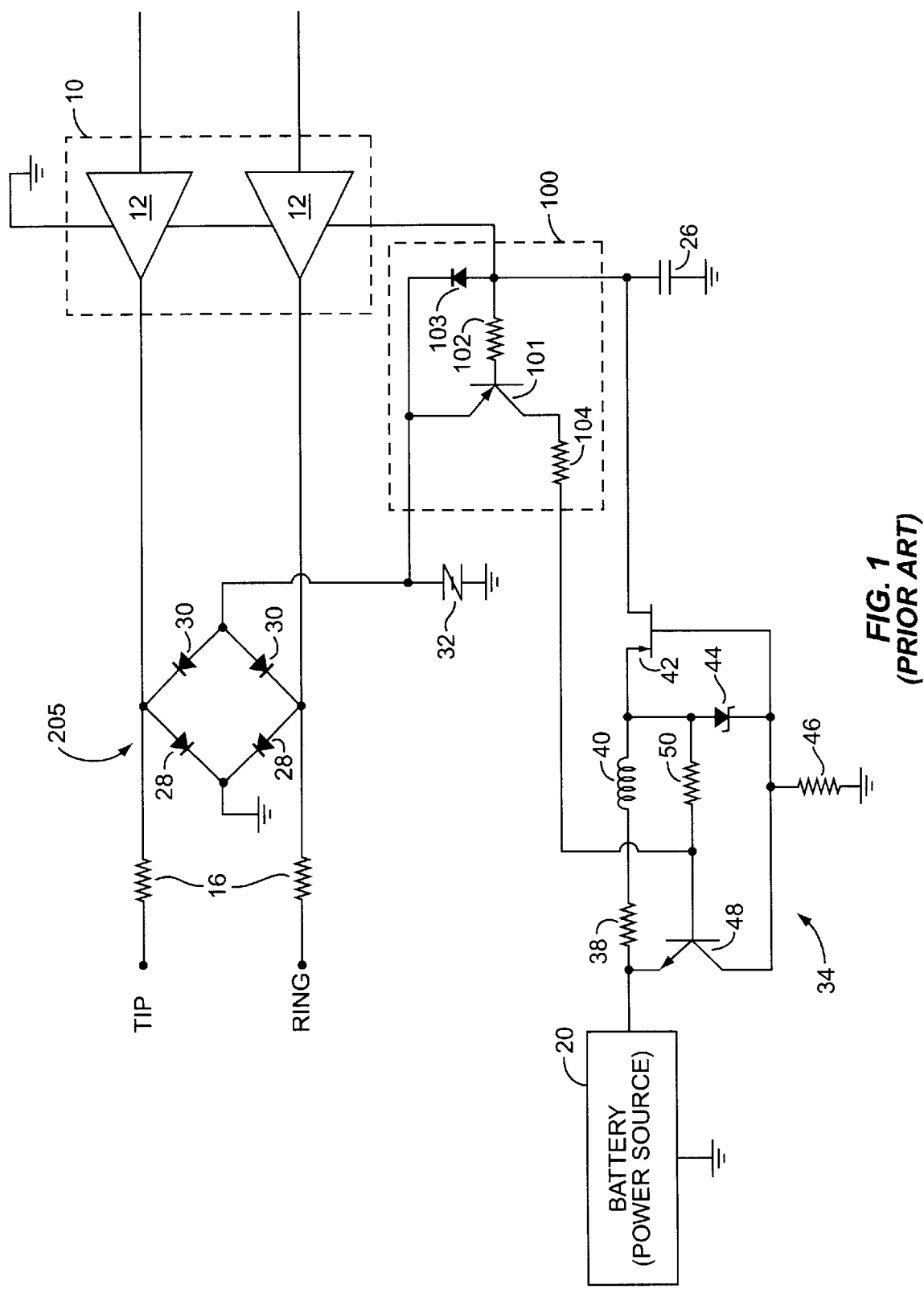
FIG. 1 is a prior art diagram of a telephone line interface circuit having a surge protection circuit and reset circuitry.
Figure 2:
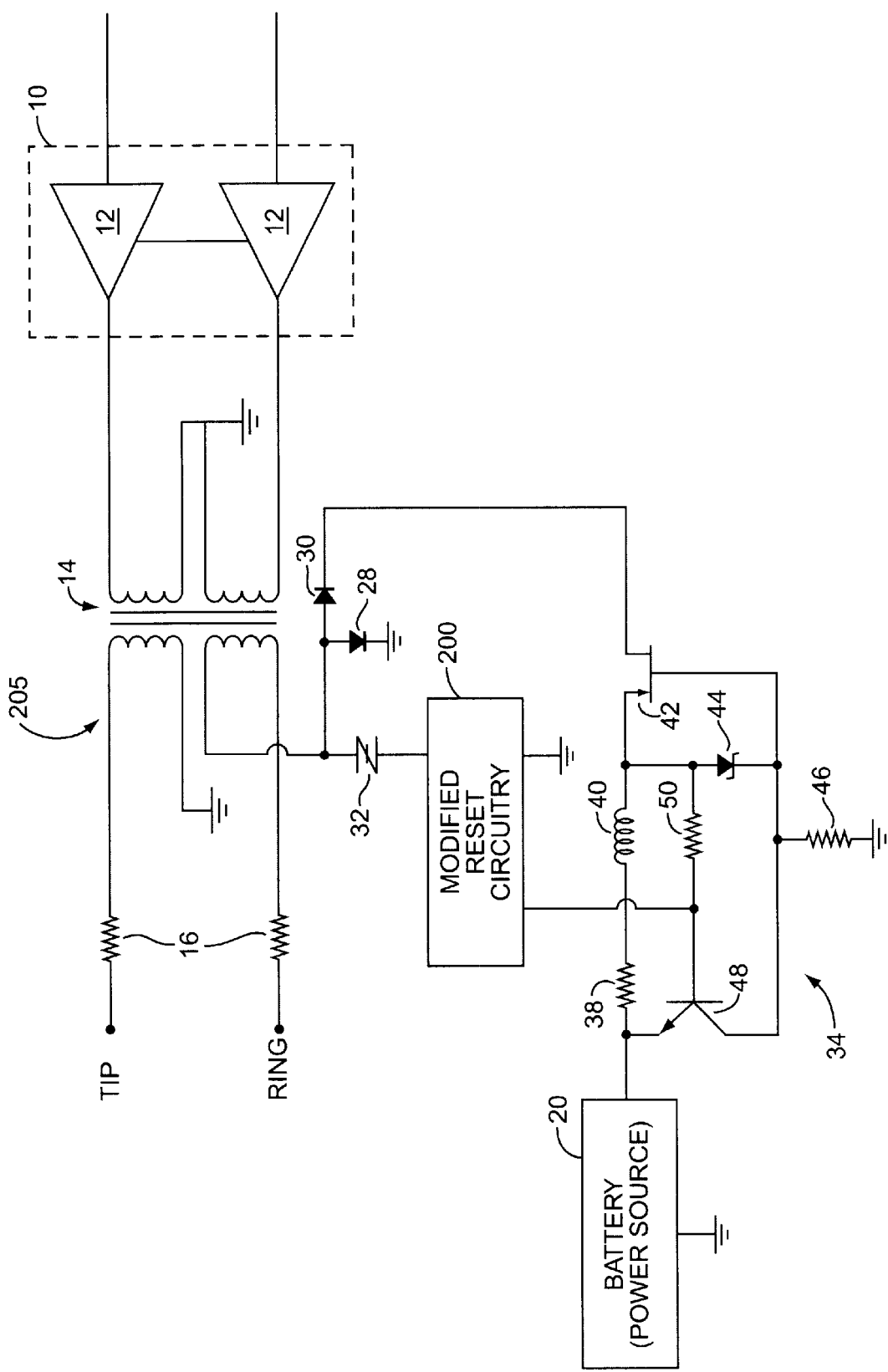
FIG. 2 is a diagram of the telephone line interface circuit of FIG. 1 modified with a modified surge reset circuit consistent with an embodiment of the present invention.
Figure 3:
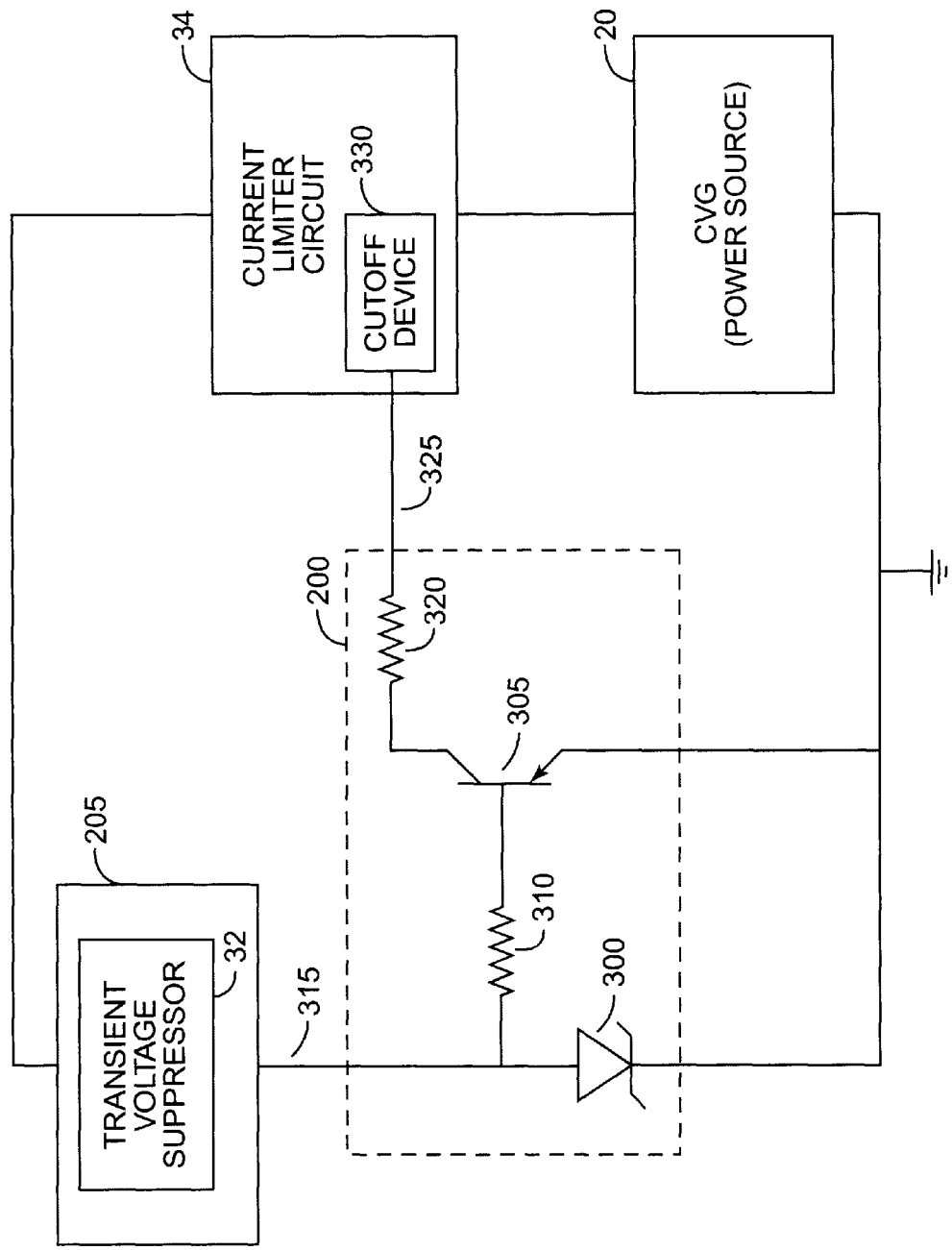
FIG. 3 is a more detailed diagram of the exemplary surge reset circuit of FIG. 2 consistent with an embodiment of the present invention.

FIG. 1 is a diagram of a conventional telephone line interface circuit known in the art as having a surge protection circuit and conventional reset circuitry. FIGS. 2 and 3 illustrate a modification to FIG. 1 with modified reset circuitry consistent with an embodiment of the present invention. Finally, FIG. 4 describes how the modified reset circuitry is used in accordance with the present invention.

Referring now to FIG. 1, an exemplary and known telephone line interface circuit is illustrated, which is typically part of a conventional telephone central office (not shown). Alternatively, the telephone line interface circuit may be part of a remote terminal coupled to a central office via a multiplexed communications path. Those skilled in the art will appreciate that not all parts of the telephone line interface circuit are illustrated in FIG. 1 in order to avoid confusion.

The telephone line interface circuit comprises a line drive circuit 10, which includes two unity-gain DC amplifiers 12. The outputs of amplifiers 12 are considered to be outputs of the line drive circuit 10 and are coupled to the TIP and RING lines of a two-wire subscriber line (not shown) via feed resistors 16.

The telephone line interface circuit also includes a controlled voltage generator (CVG) or battery 20 that is supplied from a battery voltage and a battery return line to produce a controlled voltage under the control of a digital control circuit (not shown). In the exemplary embodiment, the battery is commonly referred to as Talk Battery (e.g., −48 Volts) and the battery return line is commonly referred to as Talk Battery Return (e.g., 0 Volts or ground).

Additional details of the line drive circuit 10, the control circuit, and the operation of these are disclosed in previously noted U.S. Pat. Nos. 5,274,702 and 5,323,461. A more detailed example of a CVG, such as battery 20, is described in Rosenbaum et al. U.S. Pat. No. 5,103,387 issued on Apr. 7, 1992 and entitled "High Voltage Converter."

In one operating state of the telephone line interface, battery 20 is controlled to be inactive so that its output presents a high impedance. The battery voltage is connected to the line drive circuit's supply voltage. In other operating states of the telephone line interface, battery 20 may serve to supply ringing or other high signaling voltages to terminal T or R.

In order to protect against energy surges, the telephone line interface circuit includes surge protection circuitry. In the exemplary embodiment, the surge protection circuitry includes a front-end protection circuit 205 (implemented in FIG. 1 as a diode bridge) and a current limiter 34. In the exemplary embodiment illustrated in FIG. 1, the diode bridge is formed by two diodes 28 along with two diodes 30 and a transient voltage suppressor 32 connected in series with diodes 28, 30 to ground. The transient voltage suppressor 32 is preferably implemented using a thyristor type device, such as a TRISIL® Crowbar Type Protection Diode from SGS-Thompson Microelectronics. In this configuration, the transient voltage suppressor 32 typically has a breakdown voltage of −68 volts.

The diode bridge has AC terminals connected to the TIP and RING lines (i.e., points between the transmit and receive paths from the output of the amplifiers 12 to terminals TIP and RING, respectively). A positive DC terminal of the diode bridge is connected to ground and a negative DC terminal of the diode bridge is connected to a path to battery 20. The transient voltage suppressor 32 is connected between the diodes 30 of the diode bridge and ground.

In the event of a lightning strike or other type of transient energy surge (such as an AC voltage surge) producing a positive transient voltage at the TIP or RING lines, current is conducted to ground via one or both of the diodes 28 in the diode bridge. In the event of a lightning strike or other type of transient energy surge producing a negative transient voltage at the TIP or RING lines the transient voltage suppressor 32 engages or breaks over to create a path to the battery return for the negative surge current. In other words, the transient voltage suppressor 32 triggers at its breakover voltage (e.g., −68 V) to become a short circuit to ground. In this manner, the telephone line interface is protected from the positive and negative transient voltages.

Additionally, current limiter 34 limits the initial surge current which can cause such deterioration of various components within the telephone line interface. Without current limiter 34, the initial charging current can be very high (such as about 20 Amps). Switching this high current within the telephone line interface can be destructive and cause deterioration of its components, leading to an unreliable and faulty telephone line interface circuit.

In more detail, current limiter 34 includes a resistor 38, an inductor 40, and the source-drain path of a MOSFET 42 connected in series. A zener diode 44 is connected in parallel with the gate-source path of the MOSFET 42. The polarity of the zener diode 44 limits the gate-source voltage to less than a maximum permitted level for the MOSFET 42. A resistor 46 is connected between the MOSFET's gate and ground. An NPN bipolar transistor 48 has an emitter connected to the incoming (most negative part of the ) line and a base connected via a current-limiting resistor 50 to the source of the MOSFET 42. In this configuration, series connected resistor 38 and inductor 40 are in parallel with the resistor 50 and the base-emitter junction of the transistor 48. The collector of the transistor 48 is connected to the junction between the gate of the MOSFET 42, the zener diode 44, and the resistor 46.

Those skilled in the art will appreciate that current limiter 34 is a known circuit that responds quickly to limit the current surge when the relay contacts are initially closed. Essentially, the inductor 40 is used to allow a quicker turn-on response for transistor 48, which then limits the source-drain current flow through MOSFET 42. This limits the current supplied to capacitor 26. Furthermore, MOSFET 42 is capable of disabling operation of the current limiter 34 by turning off, which decouples battery 20 from the transient protection (i.e., the diode bridge front-end protection circuitry). A more detailed description of the current limiter's operation is disclosed in U.S. Pat. No. 5,539,820, which has already been incorporated by reference.

It is known that in some situations, additional circuitry (such as a surge reset circuit 100) is required when the current limiter and transient protection portions of the surge protection circuitry have become latched or locked up in an intermediate state. In particular, the applicant has found that after the end of a negative transient voltage or surge the current supplied by the line drive circuit 10 may still be sufficient to maintain the operation of the transient voltage suppressor 32. This current flowing through the transient voltage suppressor 32 remains large enough to prevent resetting of the transient voltage suppressor 32 back to a nominal state.

A known surge reset circuit 100 is illustrated in FIG. 1 where the voltage across the transient voltage suppressor 32 is detected using diode 103, transistor 101 and resistors 102 and 104. These elements essentially activate to cutoff power to the line drive circuit 10 in order to reduce the holding current flowing through the transient voltage suppressor. However, the applicant has found situations where the surge reset circuitry 100 fails to reset the surge protection circuitry and eliminate lockup of the telephone line interface card. As a result, the applicant has modified the circuitry used to reset the surge protection circuit to more reliably reset the surge protection circuitry.

FIG. 2 is a diagram of the telephone line interface circuit of FIG. 1 having a modified surge reset circuit consistent with an embodiment of the present invention. Referring now to FIG. 2, modified reset circuitry 200 is connected between what was the ground connection to the transient voltage suppressor 32 (as shown in FIG. 1) and a disabling control portion of the current limiter 34. Additionally, a transformer 14 is illustrated which preferably connects the TIP and RING lines to their respective amplifiers in the line drive circuit.

In this configuration, the modified reset circuitry 200 automatically resets the current limiter 34 and the transient voltage suppressor 32 based upon the amount of current flowing within the transient voltage suppressor 32 so that normal operation of the telephone line interface circuit may occur. In other words, the modified reset circuitry 200 provides a feedback signal coupled to MOSFET 42 (more generally referred to as a cutoff device) in response to the amount of current draining or discharging through the transient voltage suppressor 32. If such discharging current is detected or sensed, the modified reset circuitry 200 disables the current limiter 34 to quickly reduce the level of the current. Once the current is below a threshold or substantially eliminated, the transient voltage suppressor 32 is able to reset and the modified reset circuitry 200 then operates to re-enable the current limiter 34. This places the telephone line interface circuit back into a normal operative state. More details regarding the modified reset circuitry 200 (also called the surge reset circuit) are described below with regard to FIG. 3.

Referring now to FIG. 3, an exemplary embodiment of the modified reset circuitry 200 is illustrated consistent with the present invention that is in operative connection with parts of the telephone line interface circuit described in FIGS. 1 and 2. In the exemplary embodiment, the modified reset circuitry 200 includes a zener device 300 (operating as a detector or sensor), a feedback transistor 305, and resistors 310 and 320. One end of the zener device 300 is connected to ground while the other end is deemed terminal 315 (also called a discharge terminal) for connection to a negative surge protection portion (i.e., the transient voltage suppressor 32) of the transient front-end protection circuit 205.

Terminal 315 of the zener device 300 is also connected to the base of feedback transistor 305 via series resistor 310. The emitter of the feedback transistor 305 is connected to ground while the collector is connected to an output 325 via a series resistor 320. Thereafter, the output 325 is operatively coupled to a cutoff device 330 for the current limiter 34.

In the exemplary embodiment, feedback transistor 305 is implemented using a Model QTW51A bipolar transistor by Motorola. Resistor 310 and resistor 320 each have a value of 1 kOhm.

In operation, discharge current flows through terminal 315 of the zener device 300 (typically implemented using a Model QD-SMLVT3V3 zener diode made by SGS Thompson) to the transient voltage suppressor 32 (typically implemented as one or more thyristors or a TRISIL™ device) in the transient front-end protection circuit 205. This current is being discharged after a negative surge from a transient energy surge. As previously described, if the discharge current is present, the thyristors that are part of the transient front-end protection circuit 205 may not reset.

The zener device 300 normally operates as a sensor by providing a "sensed" voltage across the device 300 at input 315 indicative of the amount of current flowing through the device 300. In the exemplary embodiment, as long as there is a holding or discharge current, the discharge current reverse biases the zener device 300 which then generates a voltage across the device to activate the remaining part of the circuitry 200. The voltage across the device 300 is typically limited to a characteristic limiting voltage value or clamping value. This limited value represents the maximum voltage drop allowed across the device. Thus, the feedback transistor 305 is protected from a high surge current due to the nonlinear characteristic of the zener device 300.

Stated more generally, the zener device 300 operates as a type of detector indicating the amount of current still flowing within the transient voltage suppressor 32 preventing a reset of the surge protection circuitry in the telephone line interface. While the illustrated embodiment uses a nonlinear device, such as a zener diode, the present invention contemplates using other types of detectors or devices, such as a conventional current detector, capable of sensing a holding current situation.

If discharge current exists, zener device 300 remains reverse biased and the voltage at the base of feedback transistor 305 turns on the feedback transistor 305 and draws current (also referred to as feedback current) through resistor 320. As a result of turning on the feedback transistor 305, a signal (called a reset feedback signal) is generated and provided on output 325 to the cutoff device 330 to disable the current limiter circuit 34.

In the exemplary embodiment, the reset feedback signal is generated and provided from output 325 to the base of transistor 48 within the current limiter 34 as illustrated in FIG. 2. In this manner, the reset feedback signal turns on transistor 48 (a type of controlling circuit for MOSFET 42), which in turn activates MOSFET 42 to disable the current limiter 34 from operating. This effectively removes any contribution the current limiter 34 has to maintaining current draining through the transient voltage suppressor 32 and allows the discharging current to quickly be reduced below the point at which the transient voltage suppressors reset themselves. In other words, this allows the discharge current to be reduced below a threshold level or substantially eliminated in order to reset the transient voltage suppressor. This threshold level can be zero amps to approximately 100 milliamps depending on the reset threshold of the transient voltage suppressor 32.

As the amount of discharging current is substantially eliminated after the current limiter 34 has been disabled, the feedback transistor 305 is turned off and the reset feedback signal is removed from the cutoff device 330. Thus, the current limiter is re-enabled and the surge protection circuitry within the telephone line interface is once again ready to protect against transient energy surges.

Figure 4:
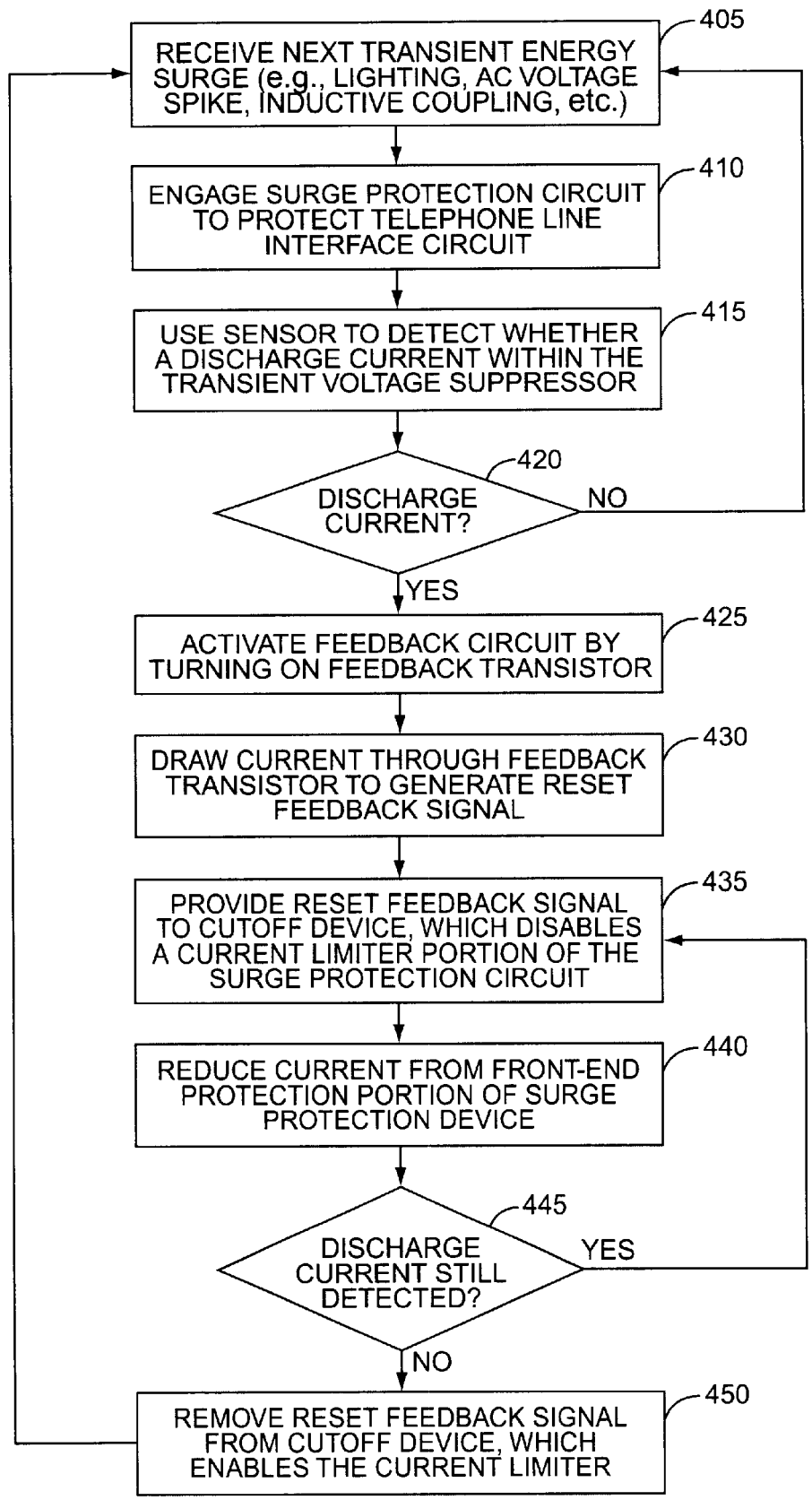
FIG. 4 is a flowchart of exemplary steps for resetting a surge protection circuit within a telephone line interface consistent with an embodiment of the present invention.

FIG. 4 depicts a flowchart of exemplary steps of a method for resetting a surge protection circuit within a telephone line interface consistent with an embodiment of the present invention. Referring now to FIG. 4, a method 400 begins at step 405 where the next transient energy surge (such as lightning, an AC voltage spike, a surge of inductively coupled energy, etc.) is received by the telephone line interface. Typically, such transient energy is received on either the T or R terminals.

At step 410, surge protection circuitry is engaged to protect the telephone line interface circuit. In the exemplary embodiment, the surge protection circuitry includes the front-end protection circuit 205 and the current limiter 34. The front-end protection circuit 205 has elements (such as diodes 28) that channel positive surge currents safely to ground and elements (such as diodes 30 and transient voltage suppressors 32) that channel negative surge currents safely to ground as well. The current limiter 34 is typically configured within the telephone line interface to protect against large current surges provided to capacitor 26 and amplifiers 12.

At this point, the surge protection circuit must be automatically reset for the next surge of transient energy. Without automatically resetting the surge protection circuit, normal operation of the telephone line interface is prevented. In general, the modified reset circuitry 200 is used to disable part of the surge protection circuitry, drain or interrupt current flowing from another part of the surge protection circuitry and then re-enable the disabled part of the surge protection circuitry. Steps 415–450 below describe these steps in more detail.

At step 415, the transient surge has occurred and the surge protection circuitry is attempting to reset itself. A sensor detects the presence of discharge current within the transient voltage suppressor. In the exemplary embodiment, the voltage generated across the zener device 300 due to the reverse bias situation is indicative of discharge current flowing within the transient voltage suppressor 32.

If there is discharge current through terminal 315 at step 420, then method 400 proceeds from step 420 to step 425. Otherwise, there is no reset problem with the transient voltage suppressor and method 400 proceeds from step 420 back to step 405 for the next transient energy wave.

At step 425, a feedback circuit is activated by turning on a feedback transistor. In the exemplary embodiment, modified reset circuitry 200 is the feedback circuit that is activated when current is flowing through terminal 315 which then generates a voltage that turns on the feedback transistor. Once the feedback transistor is biased to turn on, a feedback current is drawn through the feedback transistor at step 430 to generate the reset feedback signal.

At step 435, the reset feedback signal is provided to a cutoff device, such as MOSFET 42, which disables the current limiter. It is to be understood that the reset feedback signal in the exemplary embodiment is actually provided to transistor 48 that responsively creates another signal controlling a gate on MOSFET 42 that disables the current limiter. Despite this fact, the reset feedback signal is deemed to have been "provided" to MOSFET 42 as the cutoff device. It is also contemplated that the precise definition of a "cutoff device" may include a device and its controlling electronics (such as MOSFET 42 and controlling transistor 48). Thus, after step 435, the current limiter is disabled.

At step 440, current from the rest of the surge protection circuit through the transient voltage suppressor 32 in the surge protection circuitry is reduced. As the transient voltage suppressor 32 is typically a thyristor, the reduction in current flowing or discharging from them will eventually reach a threshold level at which the thyristors reset themselves. Typically, this occurs when the current is between 2 milliamps and 100 milliamps. Therefore, at step 445, if the discharge current is still present (e.g., is not below the threshold or is not substantially eliminated so to reset the transient voltage suppressor 32), step 445 proceeds back to step 435 where the reset feedback signal is still provided to disable the current limiter. However, if the current is less than the threshold or substantially eliminated, the thyristors have reset themselves and the telephone line interface can operate in a nominal mode again, step 445 proceeds to step 450.

At step 450, the current limiter is re-enabled by removing the reset feedback signal from the cutoff device. More specifically, the biasing voltage applied to the base of the feedback transistor 305 is removed when the discharge current is substantially eliminated, thus shutting down the feedback circuit and returning to step 405 for the next transient energy surge.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A surge reset circuit for use with a surge protection circuit comprising:
    a sensor connected to a discharge terminal of the surge protection circuit; and
    a feedback circuit connected to the sensor and capable of providing a reset feedback signal to the surge protection circuit in response to a discharge current detected by the sensor, wherein the reset feedback signal resets the surge protection circuit.

2. The surge reset circuit of claim 1, wherein the sensor is a zener device that senses the discharge current within the surge protection circuit through the discharge terminal.

3. The surge reset circuit of claim 2, wherein the surge protection circuit further comprises a current limiter for protecting a power source and a transient voltage suppression circuit having the discharge terminal and being operatively connected to the current limiter, and wherein the zener device is connected to the discharge terminal to sense the discharge current flowing through the discharge terminal.

4. The surge reset circuit of claim 3, wherein the discharge current detected the sensor is represented by a voltage level across the zener device as the discharge current flows through the zener device.

5. The surge reset circuit of claim 1, wherein the feedback circuit further comprises a feedback transistor having a base electrically connected to the sensor, the feedback transistor being operative to turn on and provide the reset feedback signal to the surge protection circuit when the sensor detects the discharge current.

6. The surge reset circuit of claim 5, wherein the surge protection circuit further comprises a current limiter and at least one thyristor connected to the current limiter for protecting a power source from a negative surge; and
    wherein the feedback transistor is operative to disable the current limiter within the surge protection circuit when the sensor detects the discharge current.

7. The surge reset circuit of claim 6 further comprising a cutoff device capable of disabling the current limiter when receiving the reset feedback signal from the feedback transistor.

8. The surge reset circuit of claim 7, wherein the cutoff device is further capable of enabling the current limiter within the surge protection circuit when the discharge current is below a threshold value.

9. A surge reset circuit for use with a surge protection circuit, the surge reset circuit comprising:
    a sensor connected to a discharge terminal of a first portion of the surge protection circuit;
    a feedback circuit connected to the sensor and capable of providing a reset feedback signal to a second portion of the surge protection circuit in response to a voltage level generated by the sensor, the voltage level representing a discharge current flowing through the discharge terminal; and
    a cutoff device connected between the feedback circuit and the second portion of the surge protection circuit, the cutoff device being capable of resetting the surge protection circuit by disabling the second portion of the surge protection circuit in response to the reset feedback signal.

10. The surge reset circuit of claim 9, wherein the sensor is a nonlinear device that limits the voltage level generated by the nonlinear device.

11. The surge reset circuit of claim 10, wherein the sensor is a zener device connected between a return for a power source and the discharge terminal.

12. The surge reset circuit of claim 9, wherein the feedback circuit further comprises a feedback transistor having a base connected to the sensor and controlled by the voltage level generated by the sensor, the feedback transistor being operative to turn on and provide the reset feedback signal to the cutoff device when the sensor detects the discharge current and generates the voltage level.

13. The surge reset circuit of claim 12, wherein the second portion is a diode current limiter;
    wherein the first portion of the surge protection circuit further comprises a front-end protection circuit capable of routing surge currents to a power source return; and
    wherein the feedback transistor is operative to disable the diode current limiter when the sensor detects the discharge current and generates the voltage level.

14. The surge reset circuit of claim 13, wherein the cutoff device is capable of resetting the front-end protection circuit by reducing the discharge current through the discharge terminal while the sensor detects the discharge current and before the diode current limiter is enabled.

15. The surge reset circuit of claim 14, wherein the front-end protection circuit further comprises a thyristor.

16. The surge reset circuit of claim 14, wherein the cutoff device is further capable of enabling the diode current limiter when the discharge current is substantially eliminated.

17. The surge reset circuit of claim 9, wherein the cutoff device further comprises a power MOSFET device.

18. The surge reset circuit of claim 17, wherein the cutoff device further comprises the power MOSFET device and a controlling circuit associated with the power MOSFET device.

19. A method for resetting a surge protection circuit, comprising the steps of:
    receiving a transient energy surge;
    protecting a power source during the transient energy surge using the surge protection circuit;
    sensing an amount of current draining from the surge protection circuit; and
    automatically resetting the surge protection circuit for a next surge based upon the amount of the current draining from the surge protection circuit;
    wherein the automatically resetting step further comprises:
        disabling a current limiter portion of the surge protection circuit;
        reducing the amount of the current flowing through a negative surge protection portion of the surge protection circuit; and
        enabling the current limiter portion of the surge protection circuit.

20. The method of claim 19, wherein the disabling step further comprises:
    generating a voltage level by the sensor that is configured between a return of the power source and a current discharge terminal of the negative surge protection portion of the surge protection circuit, the voltage level representing the amount of the current draining;
    activating a feedback circuit to generate a reset feedback signal using the generated voltage if the current is sensed to be draining; and providing the reset feedback signal to a cutoff device which disables the current limiter portion.

21. The method of claim 20, wherein the generating step further comprises generating the voltage level across a zener device.

22. The method of claim 21, wherein the activating step further comprises:

turning on a feedback transistor within the feedback device in response to the voltage level generated by the zener device; and drawing a feedback current through the feedback transistor to generate the reset feedback signal.

23. The method of claim 19, wherein the draining step further comprises reducing the amount of the current draining from the negative surge protection portion to reset the negative surge protection portion.

24. The method of claim 23, wherein the reducing step further comprises substantially eliminating the current draining from the negative surge protection portion to reset the negative surge protection portion.

25. The method of claim 24, wherein the enabling step further comprises enabling the current limiter portion of the surge protection circuit after the negative surge protection portion is reset.

26. The method of claim 25, wherein the enabling step further comprises removing the reset feedback signal from a cutoff device which enables the current limiter portion.

* * * * *